No. 697,801. Patented Apr. 15, 1902.
W. G. CAFFREY.
DIFFERENTIAL GEARING.
(Application filed May 27, 1901.)
(No Model.) 3 Sheets—Sheet 1.
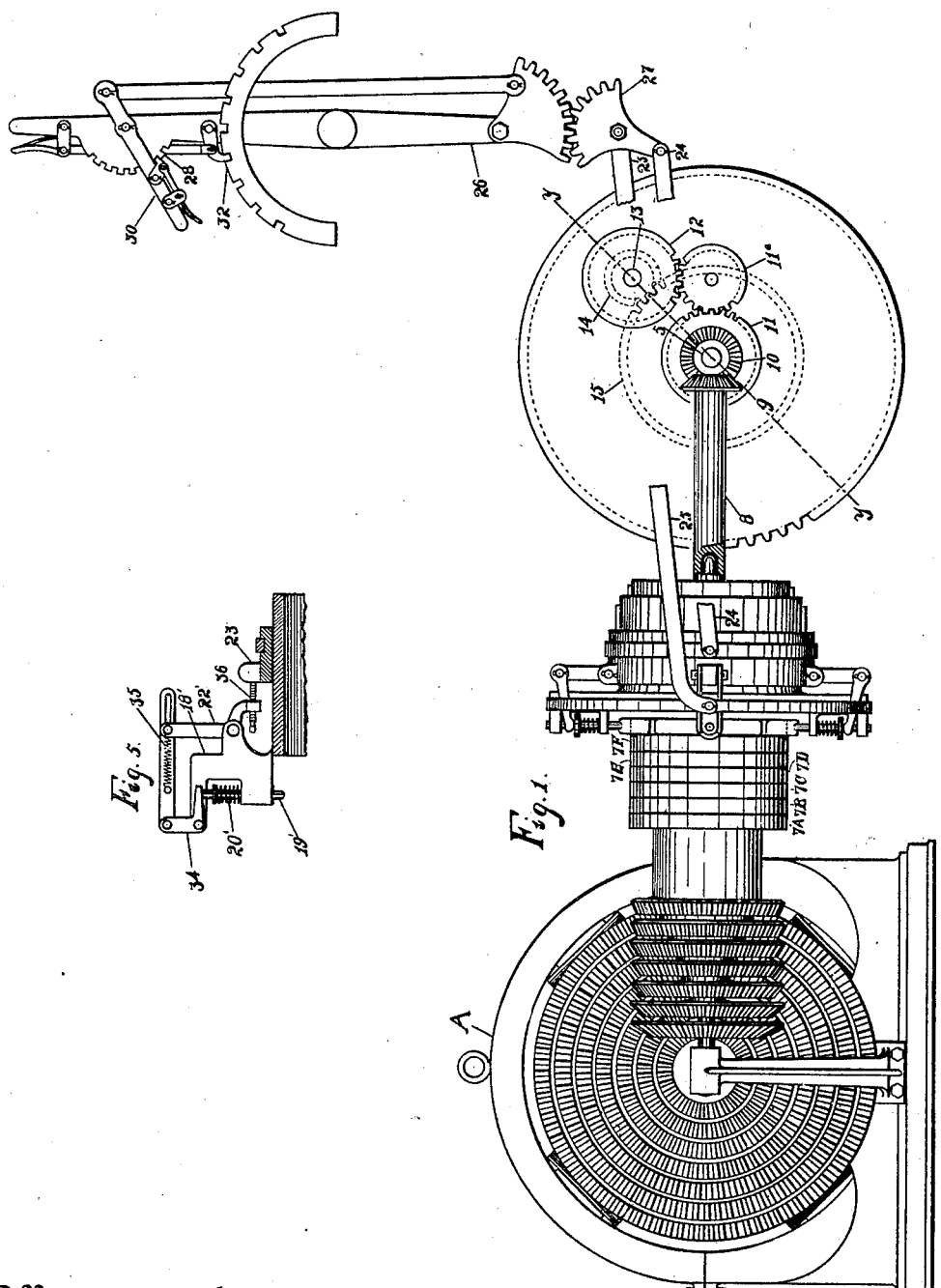

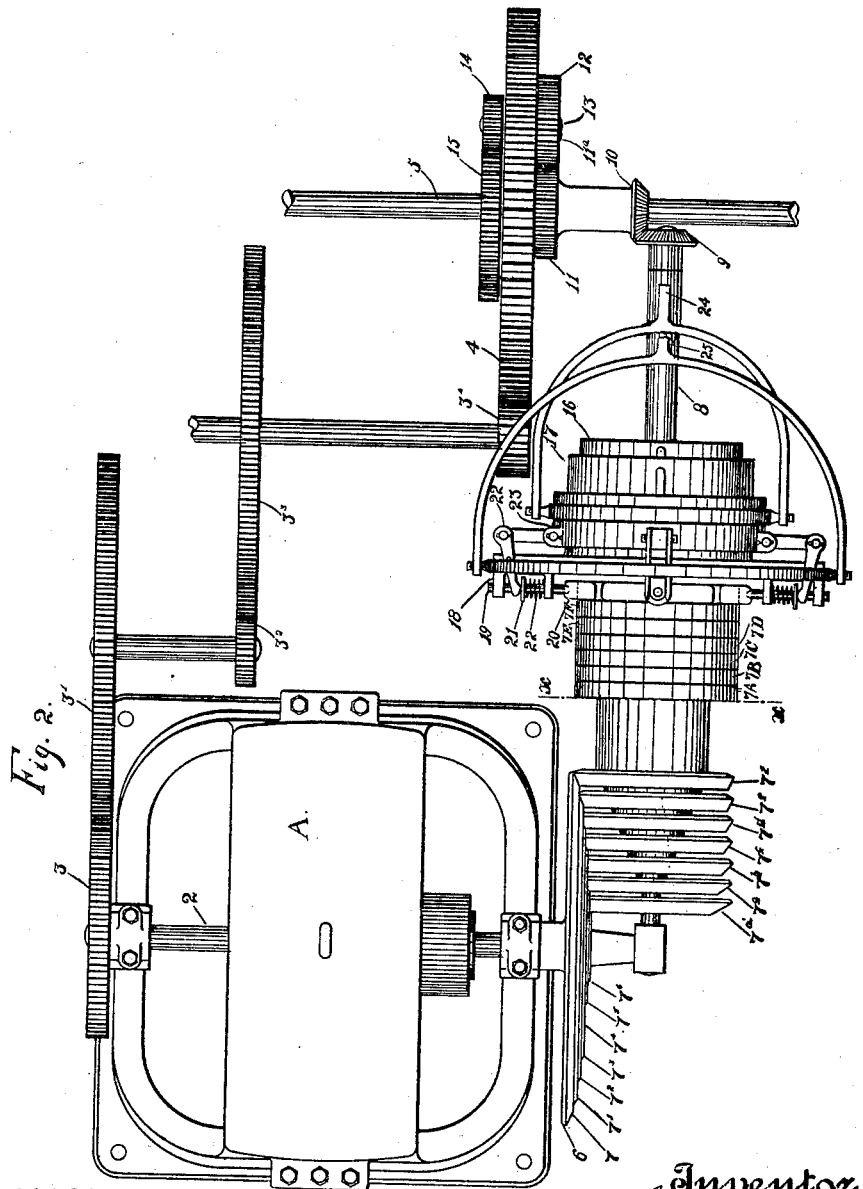

No. 697,801. Patented Apr. 15, 1902.
W. G. CAFFREY.
DIFFERENTIAL GEARING.
(Application filed May 27, 1901.)
(No Model.) 3 Sheets—Sheet 3.
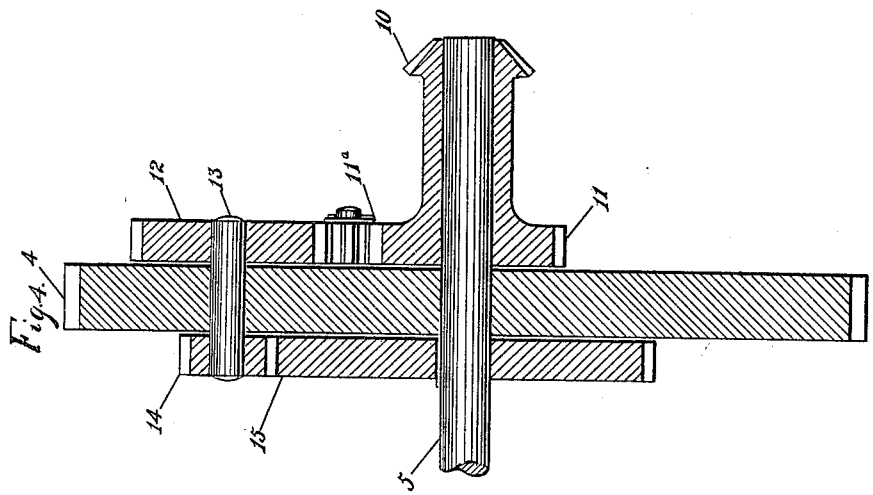
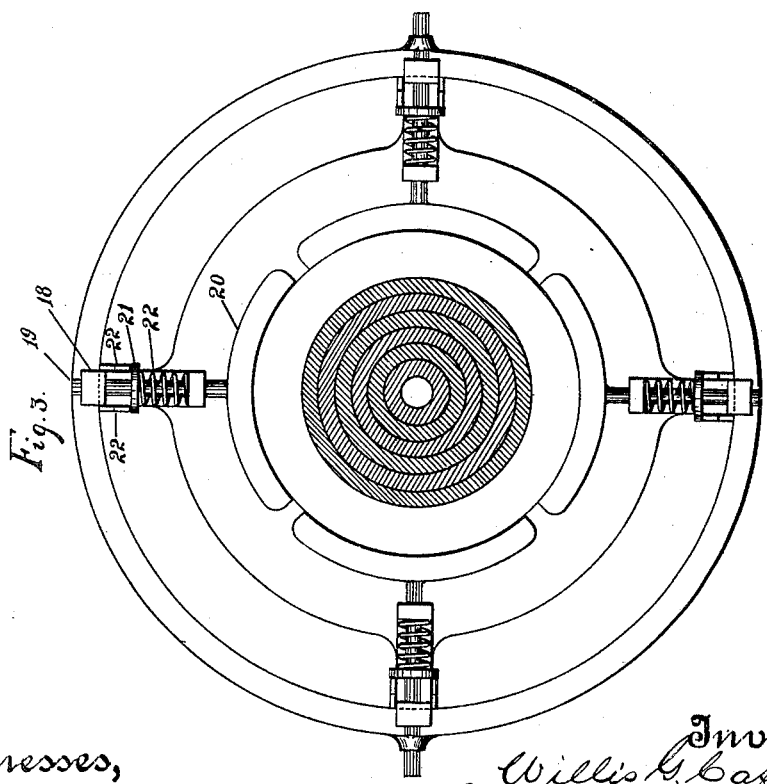

UNITED STATES PATENT OFFICE.

WILLIS G. CAFFREY, OF RENO, NEVADA.

DIFFERENTIAL GEARING.

SPECIFICATION forming part of Letters Patent No. 697,801, dated April 15, 1902.

Application filed May 27, 1901. Serial No. 62,075. (No model.)

*To all whom it may concern:*

Be it known that I, WILLIS G. CAFFREY, a citizen of the United States, residing at Reno, county of Washoe, State of Nevada, have invented an Improvement in Differential Gearing; and I hereby declare the following to be a full, clear, and exact description of the same.

My invention relates to an improved mechanism for use in connection with induction-motors or other source of constant power in one direction whence it is desired to transmit a variable motion in either direction.

It consists of the parts and the constructions and combinations of parts hereinafter described and claimed.

Figure 1 is a side elevation of the device. Fig. 2 is a plan view. Fig. 3 is a section on line $x$ $x$ of Fig. 2. Fig. 4 is a section on line $y$ $y$ of Fig. 1. Fig. 5 shows a modification.

A represents, for example, an electric motor whose shaft 2 has a constant speed in one direction. From one end of this shaft by suitable gears 3 3′, &c., motion is transmitted to a loose pulley 4 upon a shaft 5, which in this instance we will presume to be a car-axle. Upon the other end of the armature-shaft 2 is a wheel having on its face a plurality of gears 7 7′ 7², &c. Meshing the teeth of each of these gears is a corresponding number of pinions $7^{a\prime}$ $7^b$ $7^c$, &c., whose shafts revolve freely one within the other. On the opposite end of each of these shafts is fixed a flat pulley $7^A$ $7^B$ $7^C$, &c. All of said pulleys are of the same diameter and adjoin each other. The shaft of the pinion having the slowest speed—as, *e. g.*, $7^{a\prime}$—bears in a box in the armature end and its other end is revoluble in a recess in the shaft 8. Shaft 8 carries at its opposite end a pinion 9, meshing into a toothed pulley 10, loosely turnable upon the axle 5. The hub of this pulley is provided with a gear portion 11, which engages an idle gear $11^a$, journaled on the loose pulley 4. This gear $11^a$ in turn meshes with a cog-wheel 12, whose axle 13 is journaled in the loose pulley 4. Another cog-wheel 14 is fixed to the other end of the axle 13, and on the other side of the pulley 4, and has teeth engaging a gear 15, fixed to the axle 5. Accordingly as the loose pulley 4 revolves it carries the wheels 12 and 14 and the axle 13 with it. Through this gearing power is transmitted to the axle and the latter revolved in either direction or at any speed by the following means: A collar 16 is fixed upon and revoluble with the shaft 8. Upon this collar is the longitudinally-slidable sleeve 17, which is made to revolve with the collar by means of a feather-key. The sleeve 17 is provided with the projections 18, which support the radially-operating stems 19 of the chucks or clamps 20. A collar 21 is fixed on each stem, and a spring 22 serves to keep the chucks normally out of contact with the pulleys $7^A$ $7^B$, &c., for it is by the engagement of one or the other of these pulleys by said clamps that a relative speed and direction of movement is given the axle 5, as will shortly be shown. The contraction of the chucks is effected by means of the knee-levers 22, which have one member pivoted on a projection 18 and the free end of this member bearing on the collar 21, and the other member is pivoted to collar 23, slidable longitudinally on the sleeve 17 in a feather. Thus the collar 23 and sleeve 17 are slidable back and forth in relation to each other and to the collar 16, and all are revoluble in unison with the shaft 8. The sliding movement of the collar 23 and sleeve 17 is controlled by the respective clutch-levers 24 and 25. The lever 25 connects with the lever 26 through the segmental levers 27. The lever 24 connects to the lower of the segmental levers 27, which are pivoted on the lever 26. The levers 27 are connected with and operated by the lever 30, having a pawl engaging the rack 28. The lever 26 is held in any desired position by a pawl and engaging a rack 32. Thus a certain movement of the lever 26 brings the chucks 20 directly over a desired pulley, as $7^F$, when by means of the lever 30 and its connecting mechanism the chucks are clamped firmly upon said pulley and the shaft 8 thereupon partakes of the same relative movement as the pulley.

In Fig. 5 I have shown a modification of my clutch mechanism by which all danger of the chucks slipping on the pulleys is obviated. In this case the pulleys $7^A$ $7^B$, &c., are provided with notches or holes with which the spring-pins 19′ are adapted to engage. The knee-levers 22′ have one member pivoted to the projection 18′ and the other member to the bell-crank lever 34. This latter is fulcrumed on the projection 18′ and has its free arm resting on the pin 19'. The joint of the knee-levers is made resilient by means of the spring 35, attached in any desired way. As the collar 23' is moved forward its shoulder engages the adjusting-screw 36 in one end of one of the members of the knee-levers. This engagement at once tends to oscillate the bell-crank lever and force the pin 19' downward; but it may be that just at that moment the pin is not over one of the holes in the pulley, and it will ride for an instant upon the smooth surface of the pulley. The spring 35 accordingly relieves the parts of the pressure exerted by the movement of the collar 23' until the pin 19' has a chance properly to engage the pulley. Whenever the collar 23' is moved backward again the spring 20' serves to retract the pin 19' and so disengage the pulley.

Having described the component elements of my device, the operation and results would be as follows: Suppose the armature-shaft revolves constantly in one direction at the rate of one thousand revolutions per minute and that the gears 9 and 10 are out of mesh. By means of the gearing 3 3', &c., the pulley 4 will revolve constantly, but oppositely to axle 2, and will have, presumably, a speed of one hundred revolutions per minute. By reason of the ratio of gear 14 to gear 15 it is further presumed that the former will revolve ten times while making one complete circumvolution about the latter. Accordingly the gear 14 will have the same rate of revolution as (i. e., one thousand revolutions per minute) but turning in an opposite direction to the armature-shaft 2. Now accordingly as I vary the rate of revolution of the gear 14, or, what is the same thing, the gear 12, I get my variation in speed and in one or the other direction, for, as will be readily seen, if gear 14 is stopped entirely or otherwise secured to the gear 15 the latter will, and with it the axle 5, immediately partake of the same number of revolutions and revolve in the same direction as the pulley 4, which is moving constantly at one hundred revolutions per minute and constantly in one direction. If instead of allowing gear 14 to run freely about the gear 15— i. e., making ten revolutions with each circumvolution—we allow it to turn upon its axis only five times with each circumvolution, but in the same direction as before, the gear 15 and axle 5 would be obliged to turn one-half a revolution with each circumvolution of the gear 14. Accordingly the speed of the axle 5 would be fifty revolutions a minute and still in the same direction as the pulley 4.

We have seen that with ten revolutions of the gear 14 the axle 5 is stationary. For obvious reasons a further increase in the number of revolutions of the gear 14 will cause the axle 5 to turn in the opposite direction. The speed of the gears 14 or 12 is regulated through the gears 11ª, 11, 10, and 9, according as the chucks are moved to engage the pulleys 7^A 7^B, &c.

In the present instance I have shown seven pulleys. The middle one or pulley D would be designated as the "neutral" pulley, as it has such a speed as will cause the gear 14 to revolve at one thousand revolutions a minute in the same direction as the pulley 4, and consequently the axle 5 will not move. An engagement of the pulleys to the right or left of the neutral pulley will cause a respective slower or more rapid revolution of the shaft 8, and the axle 5 will revolve in one or the other direction and at a relative speed.

Having thus described my invention, what I claim as new, and desire to secure by Letters Patent, is—

1. A differential gear consisting in the combination with a shaft having a series of gears and having a constant speed in one direction, of a second shaft, loose and fixed gears upon the latter and connections between said gears and the first-named shaft whereby the second shaft is given a variable speed in either direction, said connections including a series of pinions having a common axis and said pinions adapted to engage corresponding gears on said first-named shaft.

2. The combination with a revoluble shaft of a plurality of gears upon one end of said shaft, corresponding pinions engaging said gears, the shafts of said pinions revoluble one within and independently of the other, a shaft in line with and having an axis common to said pinion-shafts, and a clutch mechanism on said alined shaft adapted to engage with one or the other of said pinion-shafts whereby said alined shaft is given the same movement as the said engaged pinion-shaft.

3. The combination with a revoluble shaft of a plurality of gears on said shaft, a corresponding number of pinions engaging said gears, said pinions having their shafts revoluble one within and independently of the other, pulleys upon each of said shafts, a shaft in line with said pinion-shafts and having a common axis therewith, a clutch mechanism upon said alined shaft including a fixed sleeve thereon a collar slidable lengthwise of and revoluble with said sleeve, knee-levers and contractible chucks and means whereby said chucks are made to engage one or the other of said pulleys.

4. The combination with a revoluble shaft, of a plurality of gears upon one end thereof, pinions meshing with said gears, the shafts of said pinions revoluble one within the other, pulleys upon said shafts, said pulleys adjacent to each other and of equal diameter, another shaft, a sleeve fixed on said shaft, a collar slidable on and revoluble with said sleeve, and clamps by which one or the other of said pulleys may be engaged when said collar is moved upon the sleeve, and means by which said slidable movement is effected.

5. The combination of a revoluble shaft, gears thereon, pinions meshing said gears, the shafts of said pinions having a common axis, a shaft carrying a clutch mechanism adapted to connect with the said pinion-shafts, said mechanism comprising a longitudinally-slidable collar, radially-contractible chucks carried upon this collar, a second collar slidable lengthwise on the first-named collar, and knee-levers having one member pivoted on the first-named collar and tending to actuate the chucks when the second collar is moved upon the first collar.

6. The combination of a revoluble shaft, gears thereon, pinions meshing said gears, said pinions having their shafts revoluble one within another, a shaft having a clutch mechanism, said clutch mechanism adapted to connect with said pinion-shafts, said mechanism including two concentric collars slidable longitudinally in relation to each other and to their supporting-shaft, a rod engaging each of said collars, a lever, one of said rods connecting directly with said lever by which its respective collar is operated, and a segmental lever-and-rack device pivoted on said last-named lever and with which the other rod is connected and by which its respective collar is operated.

7. The combination of a shaft revoluble in one direction at constant speed, a second revoluble shaft, a loose pulley on said second shaft, a fixed gear also thereon, gears journaled on said loose pulley and engaging said fixed gear, connection between the first-named shaft with the loose pulley whereby the latter is given a constant relative speed in one direction, and connections of the first-named shaft with the gears carried on the loose pulley whereby the speed of said gears may be varied, and a motion in either direction given the second-named shaft.

8. A differential gear consisting in combination of a shaft revoluble at constant speed in one direction, a series of gears thereon, pinions meshing said gears, the shafts of said pinions revoluble one within another, pulleys fixed on each of said pinion-shafts, a shaft continuous with the innermost of said pinion-shafts and independently revoluble therewith, a clutch mechanism on said shaft adapted to engage one or the other of said pulleys whereby the last-named shaft is given a like motion to the pulley, a shaft carrying fixed and loose pulleys, connections between said pulleys and means whereby said loose pulleys are revolved each constantly in one direction.

9. A differential gear consisting in combination of a revoluble shaft, a series of gears thereon, pinions engaging said gears, said pinions having their shafts revoluble one within another, a shaft carrying engaging fixed and loose pulleys, one of said loose pulleys adapted to be revolved constantly at a relative speed with the first-named shaft, and connections of the other loose pulley with one or the other of said pinion-shafts whereby said pulley is given a movement relative to said pinion-shaft.

In witness whereof I have hereunto set my hand.

WILLIS G. CAFFREY.

Witnesses:
MARCUS FREDRICK,
A. E. CHENEY.